L. D. OWREY.
AUTOMATIC OIL RELEASE.
APPLICATION FILED OCT. 28, 1912.
1,065,169.
Patented June 17, 1913.
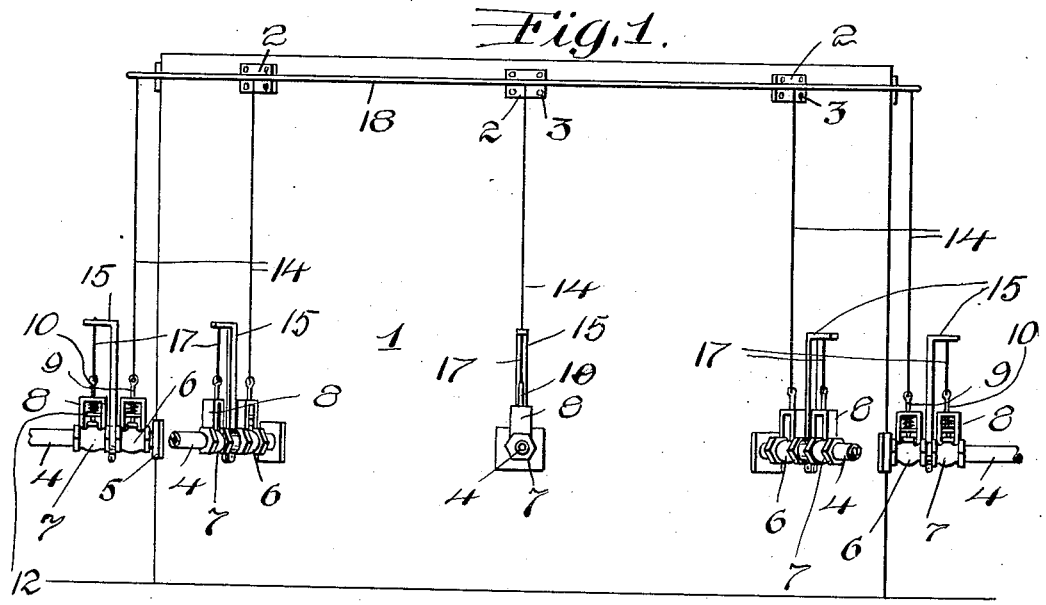
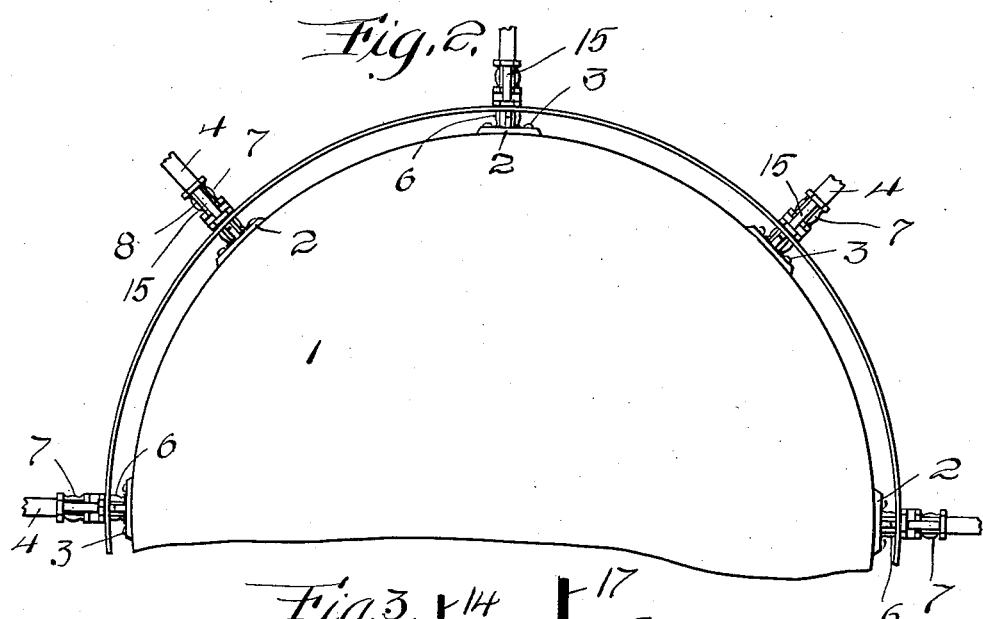
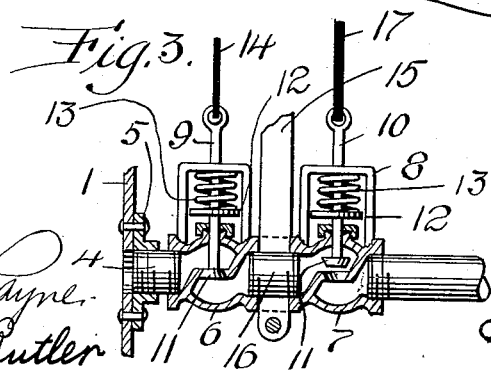
WITNESSES
Samuel Payne
Karl H. Butler
INVENTOR
L. D. Owrey
ATTORNEYS

UNITED STATES PATENT OFFICE.

LUTE D. OWREY, OF PITTSBURGH, PENNSYLVANIA.

AUTOMATIC OIL-RELEASE.

1,065,169. Specification of Letters Patent. Patented June 17, 1913.

Application filed October 28, 1912. Serial No. 728,120.

*To all whom it may concern:*

Be it known that I, LUTE D. OWREY, a citizen of the United States of America, residing at Pittsburgh, in the county of Allegheny and State of Pennsylvania, have invented certain new and useful Improvements in Automatic Oil-Releases, of which the following is a specification, reference being had therein to the accompanying drawing.

This invention relates to an automatic oil release for oil tanks and other storage receptacles, and the primary object of my invention is to furnish an oil tank with automatic means for releasing high grade oil from the tank, should the tank catch fire or be in a dangerous position relatively to an adjacent burning structure.

Another object of this invention is to furnish an oil tank with outlet pipes that are equipped with automatic valves, one of which is normally closed and the other normally open, the former being automatically opened to release high grade oil and the latter automatically closed to prevent the escape of a residue, low grade or inferior quality of oil.

A further object of this invention is to accomplish the above results by an automatically operated device that is applicable to various types of receptacles containing inflammable and dangerous liquids that are liable to explode when a fire occurs.

With the above and other objects in view the invention resides in the novel construction, combination and arrangement of parts to be hereinafter specifically described and then claimed.

Reference will now be had to the drawing wherein:—

Figure 1 is a side elevation of an oil tank provided with the device, Fig. 2 is a plan of a portion of the same, and Fig. 3 is an enlarged longitudinal sectional view of valves controlling the release of oil.

Further describing my invention in detail with reference to the accompanying drawing, wherein like numerals denote corresponding parts throughout: 1 denotes a tank, reservoir or other receptacle containing inflammable or dangerous liquid. The side walls of the tank, at the top thereof, are provided with outriggers or brackets 2 that are riveted or otherwise connected to the tank, as at 3.

4 denotes outlet pipes connected to the tank 1, adjacent to the bottom thereof, as at 5, said outlet pipes being located directly beneath the outriggers or brackets 2. Each outlet pipe has a release valve body 6 and a shut off valve body 7, said valve bodies having guide yokes 8 for valve stems 9 and 10 that extend into the valve bodies 6 and 7 respectively. The valve stems 9 and 10 are provided with valves 11 within the valve bodies and the heads 12 within the yokes 8. Encircling the valve stems 9 and 10, between the yokes 8 and the heads 12 are coiled compression springs 13 adapted to automatically shift the valve stems 9 and 10, when released. The valve stem 9 is connected to the outrigger or bracket by a very sensitive soft metal fuse 14. The valve stem 10 is connected to an overhanging bracket 15 clamped upon a pipe 16 connecting the valve bodies 6 and 7. The connection with the valve stem 10 and the overhanging bracket 15 is by a fuse 17 that has greater lasting qualities than the sensitive fuse 14, whereby the sensitive fuse will be burned out or give way somewhat prior to the destruction of the fuse 17. It is therefore apparent that in case of fire the valve body 6 is opened to release oil from the tank 1, the better grade of oil escaping. Eventually the fuse 17 is burned out and the valve body 7 closed, thereby preventing the escape of residue, low grade or an inferior oil.

By reference to Figs. 1 and 2 it will be observed that a plurality of the automatic release devices are used and to brace the outriggers or brackets 2, said outriggers are connected by a ring 18.

It is thought that the operation and utility of the device will be apparent without further describing my invention, and while in the drawing there is illustrated a preferred embodiment of the invention, it is to be understood that the structural elements are susceptible to such variations and modifications as fall within the scope of the appended claim.

What I claim is:—

In an automatic release for oil tanks, a tank, release pipes adjacent to the bottom thereof, valves supported by said pipes, a bracket supported by said pipes, spring actuated valve stems in connection with said valves, outriggers carried by said tank, fuses connecting some of said valve stems to said outriggers and fuses connecting the other of said stems to said bracket.

In testimony whereof I affix my signature in the presence of two witnesses.

LUTE D. OWREY.

Witnesses:
MAX H. SROLOVITZ,
KATHERINE ERRETT.

Copies of this patent may be obtained for five cents each, by addressing the "Commissioner of Patents, Washington, D. C."